(No Model.) 3 Sheets—Sheet 3.

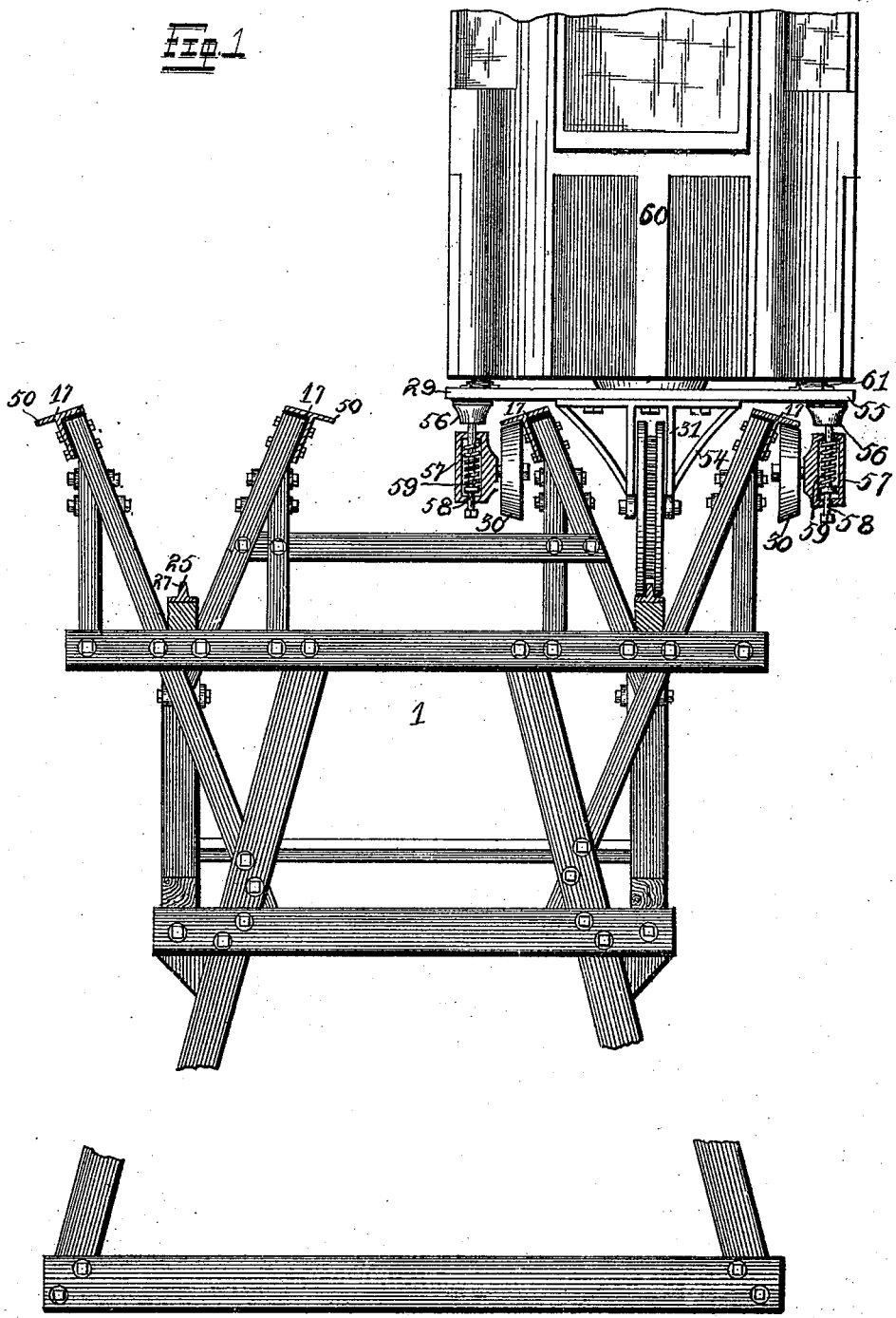

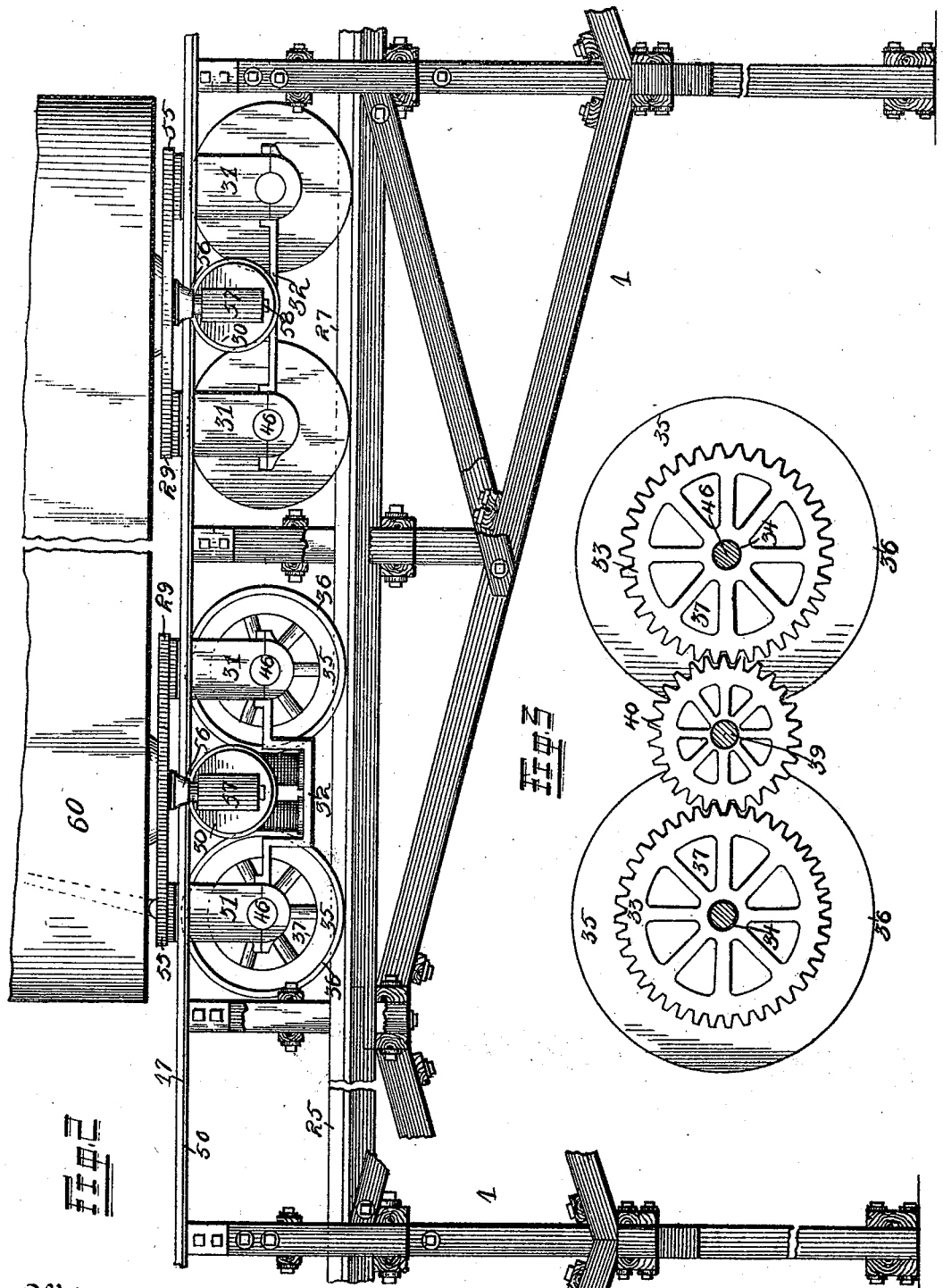

E. M. TURNER.
TRUCK OR VEHICLE FOR ELEVATED RAILWAYS.

No. 501,174. Patented July 11, 1893.

Witnesses
Alfred A. Eicks
Herbert S. Robinson

Inventor
Ephraim M. Turner
By his Attorneys
Higdon & Higdon & Longan

UNITED STATES PATENT OFFICE.

EPHRAIM M. TURNER, OF ST. LOUIS, MISSOURI, ASSIGNOR OF ONE-HALF TO R. E. MADDOX, OF FORT WORTH, TEXAS.

TRUCK OR VEHICLE FOR ELEVATED RAILWAYS.

SPECIFICATION forming part of Letters Patent No. 501,174, dated July 11, 1893.

Application filed April 22, 1892. Serial No. 430,221. (No model.)

*To all whom it may concern:*

Be it known that I, EPHRAIM M. TURNER, a citizen of the United States, residing at St. Louis, State of Missouri, have invented certain new and useful Improvements in Trucks or Vehicles for Elevated Railways, of which the following is a full, clear, and exact description, reference being had to the accompanying drawings, forming a part hereof.

My invention relates to improvements in trucks or vehicles for elevated railways, and consists in the novel arrangement and combination of parts as will be more fully hereinafter described and designated in the claims.

Figure 4:
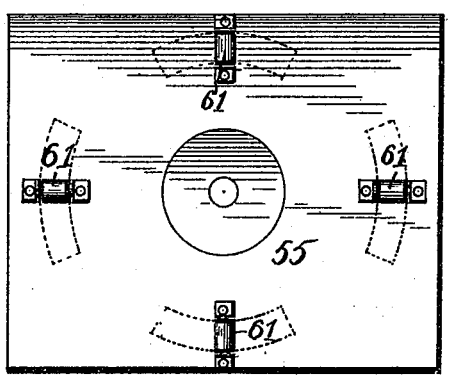
Figure 5:
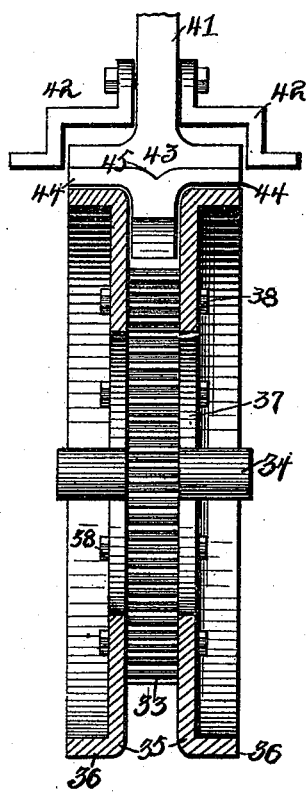
Figure 6:
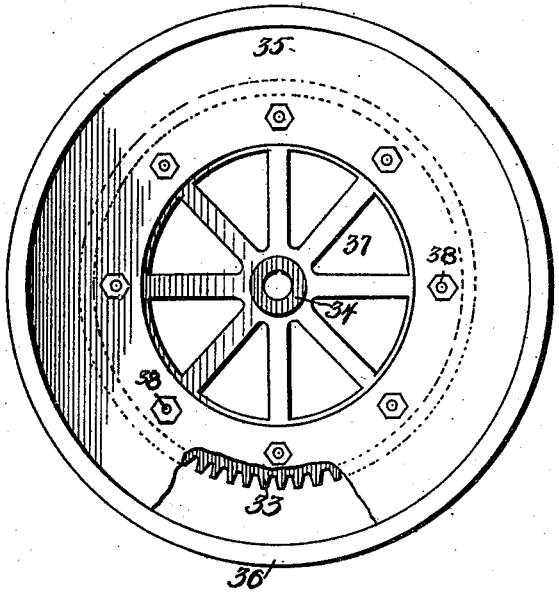

In the drawings: Figure 1, is an end view of a super-structure with a car in an operative position mounted upon the same. Fig. 2, is a side elevation of the super-structure showing the trucks of the car in an operative position on the same. Fig. 3, is a vertical longitudinal section of the traction-wheels with parts removed showing the gearing mechanism. Fig. 4, is a top plan view of one of the trucks, especially showing its anti-friction bearings. Fig. 5, is a diametrical section of the traction-wheel showing the relative positions of the brake-shoes to the same. Fig. 6, is a side elevation of one of the traction-wheels with the parts broken away showing its gearing mechanism.

The object of my invention is to construct a truck or vehicle for elevated railways that is strong and durable, yet simple and mechanical in its construction and comparatively speaking cheap as compared with other constructions of the same character.

My invention further relates to a certain principle of construction (to be more fully hereinafter described), whereby the resultant of the lateral motion or force of the car-body is exerted or thrown vertically downward on the wheels of the car. In other words the wheels act as a fulcrum for the weight of the car-body regardless of any position that the same may assume.

By constructing the wheels of the carriage or vehicle as hereinafter described, a very light and cheap truck is obtained and by gearing both traction-wheels together to the same source of power a very strong traction power is necessarily obtained.

I will give a further description of the operation and advantages of my invention in connection with the mechanical description thereof.

Referring to the drawings: 1 represents the preferred construction of super-structure upon which my improved truck or vehicle is designed to be operated. This superstructure comprises essentially guide-rails, 17, arranged in reversely-inclined pairs, and a traction-rail, 25, arranged intermediately of each pair of guide-rails and in a lower plane.

Having briefly described the essential features of the super-structure I shall now proceed to describe the truck mechanism and also the wheels of the vehicle. By preference I employ two trucks to each car, one located at the front end and the other at the rear end of said car. The forward one of said trucks or the one located at the front end is constructed to receive the power for imparting motion to the vehicle, and the rear truck only adapted to support that end of the car. The wheels of both trucks are similarly constructed but the gearing mechanism carried by the front truck is not carried out in the rear truck and consequently I shall only describe the said forward or traction-truck in detail.

29, indicates the truck-frames which are provided with a skeleton frame-work 54 and with a plate 55 the same being secured together in any suitable and mechanical manner.

Secured to the plate 55 in any suitable and mechanical manner but insulated therefrom are depending standards 56. Yieldingly mounted on said standards are sleeves 57, which are secured to said standards by means of bolts 58. Said bolts 58 are screwed into suitable screw-threaded perforations formed in said standard, and mounted on said bolts 58 are spiral springs 59 for giving the said sleeves a yielding upward motion. Mounted on said sleeves 57 are guide-wheels 30 which are adapted to come in contact, or in fact are always normally in contact with the webs 50 of the guide-rails 17, (referring to Fig. 1 for illustration.) The guide-wheels 30 are provided with an inclined peripheral surface corresponding to the inclined web 50 of the guide-rail.

By referring to Fig. 1 for illustration it can be readily seen that from the construction of the guide-wheels and the arrangement and construction of the webs 50 said guide-wheels cannot run or work laterally out of their appropriate positions beneath said webs, and also that said guide-wheels prevent lateral motion of the truck-frame and consequently the car-body mounted on the same to any great extent. For instance, referring to Fig. 1 for illustration, if the car-body 60 should incline to the right the guide-wheel to the left will check said lateral movement and the resultant of the force incident to said lateral movement will be directed on the traction-wheel of the vehicle, and a similar operation or effect will be produced if the car-body 60 should incline or tilt to the left. From this construction it can be readily perceived that there is not the slightest possibility of the truck-frame and car-body running off the track. The plate 55 of the truck-frame is provided with anti-friction rollers 61 radially arranged as illustrated in Fig. 4 so as to facilitate the easy movement of the truck-frames beneath the body of the car, it being noted that the bottom of the car-body rests directly or indirectly on the anti-friction rollers.

I will now proceed to describe the remaining parts of the running gear of the vehicle.

Referring to the forward truck 31 indicates the two depending arms or bearings for the forward and hind wheels of the said truck.

32, represents braces the ends of which are attached in any suitable and mechanical manner to the frame and are adapted to support the motors for imparting motion to the said truck.

I desire to state in this connection that I do not wish to limit myself to the shape or construction of said depending arms nor to the construction of the supporting mechanism secured thereto for carrying the motive power. And I further desire to state that I do not limit myself to any particular power for imparting motion, but for the sake of clearness I have shown an electric motor mounted on the braces 32 in order that the parts in the operation of the device may be fully understood.

In Figs. 3, 6 and 7 I have illustrated more clearly the wheels which I employ and in describing said wheels and details reference should be had to said figures.

Each of the wheels of the forward truck is similarly constructed and I shall therefore only proceed to describe one of them in detail.

33, represents a gear-wheel having a hub 34 and spokes for attaching said hub to the rim of the wheel.

35 represents two disks each of which is provided with outwardly extending flanges 36, the outer or peripheral surfaces of which form the tread of the wheel and are adapted to come in contact and fit with the parallel surfaces 26 of the traffic-rail 25. Each of the said disks is provided with circular openings 37 through which the hub 34 of the gear-wheel is adapted to be located. The said disks 35 are attached to the gear-wheel 33 by means of bolts 38 which bolts pass through suitable perforations formed in said disks, and also through similar perforations formed in the rim of the gear-wheel 33. The space between the two disks is formed by the width of the gear-wheel 33 forming a space for the extension 27 of the traffic-rail 25.

In Fig. 3 I have shown the manner of gearing in which 39 represents the power-shaft which may be rotated by any suitable power as above stated, and keyed to said shaft is a gear-wheel 40, the teeth of which mesh with the teeth formed on the gear-wheels 33.

In carrying out the above construction it is necessary to construct the brake as I shall now proceed to describe, (referring to Fig. 6 for illustration.)

41, represents a hand-lever which is movably secured to the front truck of the vehicle by means of bearings 42 which are carried by the truck-frame. The lower end of the lever 41 has secured thereto in any suitable and mechanical manner, or formed integrally therewith a brake-shoe 43, having two contact surfaces 44, and between said contact surfaces is a projecting or dependent portion 45 which when the brake is applied the said depending portion will be located between the two disks—holding the said shoe in its proper position for action upon the wheel—thus retarding the motion of the same. The wheels of the trucks are mounted and secured to the same by shafts 46 which pass through the bearings 31 of the trucks and through the hubs 34 of the gear-wheels 33.

Although I have shown and described one way of yieldingly mounting the guide-wheels 30 to the truck-frame I do not limit myself to said construction. And furthermore although I have shown and described a certain construction of the guide-rails and guide-wheels wherein the latter are located beneath the former and locked thereunder relative to lateral motion, I desire to state that I may use a different construction to accomplish the same end. And still further although I have shown only the front truck-wheels in connection to the motive power I may likewise connect the rear truck-wheels to a suitable motive power.

Having fully described my invention, what I claim is—

1. A truck wheel for elevated railways comprising two disks approximately U-shape in cross-section, the flanges of said disks projecting outwardly; substantially as and for the purpose set forth.

2. A truck wheel for elevated railways comprising two disks approximately U-shape in cross section and having their flanges projecting outwardly, and a gear wheel interposed between said disks and rigidly secured thereto; substantially as and for the purpose set forth.

3. In an elevated railway the combination of a truck-wheel comprising two disks located a suitable distance apart, and a brake-shoe adapted to be brought in contact simultaneously with both of said disks for retarding the motion of said wheel, substantially as set forth.

4. In an elevated railway a truck, wheels composed of disks of equal diameters mounted on said trucks, a gear-wheel of less diameter interposed between the said disks and secured against independent rotation, a brake-shoe provided with a projecting portion adapted to be brought in contact with the outer surfaces of said disks—the said extension of said brake-shoe when normally applied being located between the said disks for holding the said shoe in its proper relation to the same, substantially as set forth.

5. In an elevated railway a truck-frame, disks of equal diameters forming wheels for the said trucks, gear-wheels mounted between said disks, and an intermediate gear-wheel located between the gear-wheels carried by the said disks and adapted to mesh with the same for imparting motion thereto, substantially as set forth.

6. In an elevated railway a truck having a plate 55 carrying anti-friction wheels, a skeleton frame-work 54 secured to said plate, gear-wheels 33, disks 35 secured to the said gear-wheels and adapted to be actuated by the same, a power shaft such as 39 located between the said wheels and suitably geared to a source of power, a gear-wheel 39 keyed to said shaft the teeth of which are adapted to mesh with said gear-wheels 33 for imparting motion to the same, and a brake as described carried by the said truck and adapted to be simultaneously brought in contact with the surfaces of the said disks, substantially as set forth.

7. An elevated railway having a truck, wheels mounted on or carried by the same each of which is provided with gear-wheels, and a gear-wheel located between, the said first mentioned gear-wheels for simultaneously actuating the same, substantially as set forth.

8. In an elevated railway a truck carrying wheels of the character described, a power-shaft located between the said wheels and adapted to simultaneously actuate the same, substantially as set forth.

9. In an elevated railway a truck-wheel comprising two disks 35 provided with outwardly formed flanges 36, a gear-wheel 33 located between said disks but of less diameter than the disks, bolts 38 adapted to pass through said disks and through the rim of said gear-wheels, circular openings 37 formed in the said disks, a hub 34 formed on said gear-wheel, and projecting through said opening 37 thus providing means for removably attaching said wheel to the truck, substantially as set forth.

10. In an elevated railway, the combination, with a truck frame, of rigid standards projecting downwardly therefrom, and a casing yieldingly mounted on each of said standards and carrying a guide-wheel adapted to engage the under side of a guide track; substantially as and for the purpose set forth.

11. In an elevated railway, the combination, with reversely-inclined tracks, of a truck, and reversely beveled guide wheels yieldingly mounted on the truck and contacting with the under faces of said rails; substantially as and for the purpose set forth.

12. In an elevated railway a truck-frame, a combined traction and tread-wheel mounted on the same, yieldingly secured guide-wheels carried by said truck-frame and so located relative to the guide-rails that they throw the resultant of the lateral force exerted upon the truck-frame directly on the combined traction and tread-wheel, substantially as set forth.

13. In an elevated railway a guide-rail provided with downwardly inclined tread surface, a truck-frame, yieldingly secured guide-wheels provided with downwardly inclined surfaces carried by said truck-frame and located beneath said guide-rails and interlocked thereunder, relative to outward lateral movement, substantially as set forth.

In testimony whereof I affix my signature in presence of two witnesses.

EPHRAIM M. TURNER.

Witnesses:
C. K. JONES,
ALFRED A. EICKS.